US009053621B2

(12) United States Patent
Lin

(10) Patent No.: US 9,053,621 B2
(45) Date of Patent: Jun. 9, 2015

(54) IMAGE SURVEILLANCE SYSTEM AND IMAGE SURVEILLANCE METHOD

(71) Applicant: Chun-Hung Lin, Hsinchu (TW)

(72) Inventor: Chun-Hung Lin, Hsinchu (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 91 days.

(21) Appl. No.: 13/958,629

(22) Filed: Aug. 5, 2013

(65) Prior Publication Data

US 2015/0010213 A1 Jan. 8, 2015

(30) Foreign Application Priority Data

Jul. 3, 2013 (TW) ............................. 102123853 A

(51) Int. Cl.
*G06K 9/00* (2006.01)
*G08B 13/196* (2006.01)

(52) U.S. Cl.
CPC ................................ *G08B 13/19602* (2013.01)

(58) Field of Classification Search
None
See application file for complete search history.

(56) References Cited

U.S. PATENT DOCUMENTS

| | | | | |
|---|---|---|---|---|
| 6,696,945 | B1 | 2/2004 | Venetianer et al. | |
| 6,970,083 | B2 | 11/2005 | Venetianer et al. | |
| 7,023,469 | B1 | 4/2006 | Olson | |
| 7,893,819 | B2 | 2/2011 | Pfeiffer et al. | |
| 8,165,348 | B2 | 4/2012 | Hampapur et al. | |
| 8,320,628 | B2 | 11/2012 | Cheng et al. | |
| 2004/0199327 | A1* | 10/2004 | Isogai et al. | 701/301 |
| 2011/0033087 | A1* | 2/2011 | Finn et al. | 382/103 |
| 2012/0086780 | A1 | 4/2012 | Sharma et al. | |
| 2013/0129144 | A1* | 5/2013 | Chang et al. | 382/103 |

FOREIGN PATENT DOCUMENTS

| | | |
|---|---|---|
| CN | 101211495 | 7/2008 |
| TW | 201007626 | 2/2010 |
| TW | 201209762 | 3/2012 |
| WO | 03058569 | 7/2003 |

OTHER PUBLICATIONS

"Office Action of Taiwan Counterpart Application", issued on Dec. 22, 2014, p. 1-p. 5.

* cited by examiner

*Primary Examiner* — Jayesh A Patel
*Assistant Examiner* — Mai Tran
(74) *Attorney, Agent, or Firm* — Winston Hsu; Scott Margo

(57) ABSTRACT

An image surveillance system and an image surveillance method are provided. The image surveillance method includes following steps. An image is captured, and at least one reference target is defined in the captured image. A monitored object in the image is identified. A distance between the monitored object and each of the at least one reference target is individually calculated. Whether to announce at least one warning is determined according to a relationship between at least one threshold and the distance.

10 Claims, 4 Drawing Sheets

IMAGE SURVEILLANCE SYSTEM AND IMAGE SURVEILLANCE METHOD

CROSS-REFERENCE TO RELATED APPLICATION

This application claims the priority benefit of Taiwan application serial no. 102123853, filed on Jul. 3, 2013. The entirety of the above-mentioned patent application is hereby incorporated by reference herein and made a part of this specification.

BACKGROUND OF THE INVENTION

1. Field of the Invention

The invention relates to a surveillance system and a monitor method; more particularly, the invention relates to an image surveillance system and an image surveillance method.

2. Description of Related Art

With the advance of science and technology, people in hopes of creating a secure living environment strive to prevent theft by all means. An infrared detector commonly used in our daily lives is an anti-theft device. If the detected intensity of the infrared ray exceeds a standard value, the system announces a warning of possible break-ins and intrusions. However, said detection system requires a set of infrared transmitter and infrared receiver for announcing warnings within a certain distance, and the lack of either the infrared transmitter or the infrared receiver results in the impossibility of infrared detection. Besides, burglars are apt to find the loopholes in the security system and get rid of the detection. Another anti-theft device, i.e., an electronic barking-dog alarm, is frequently used in residential areas. Given that a radar senses the movement of an object within a certain range, the electronic barking-dog alarm starts barking like an angry watchdog, so as to intimidate and deter burglars. Nevertheless, the barking-dog alarm merely works within close range, and erroneous detections often occur. With use of said two surveillance systems, if the detection range is intended to be expanded, significant costs are incurred without a doubt.

Owing to the small volume, the ordinary surveillance cameras are frequently applied to the surveillance system. In most cases, the surveillance cameras are placed high to monitor at different angles, and images taken by the surveillance cameras may be retained for future reference if required. Security guards may monitor certain areas through watching the images taken by the surveillance cameras. However, the security may still be compromised if the security guards do not constantly watch the images. Accordingly, how to perform surveillance in a sufficiently secure manner has drawn public attention.

SUMMARY OF THE INVENTION

The invention is directed to an image surveillance method and an image surveillance system. When a monitored object approaches a reference target, the image surveillance system determines whether to announce a warning (e.g., sound and/or light) according to a distance from the reference target to the monitored object.

In an embodiment of the invention, an image surveillance method suitable for an image surveillance system is provided. The image surveillance method includes following steps. An image is captured, and at least one reference target is defined in the captured image. A monitored object in the image is identified. A distance between the monitored object and each of the at least one reference target is individually calculated.

It is determined whether to announce at least one warning according to a relationship between at least one threshold and the distance.

According to an embodiment of the invention, the at least one reference target includes at least one of a point, a line, and an area in the image.

According to an embodiment of the invention, the step of identifying the monitored object in the image includes comparing the image with an initial image and identifying a difference between the image and the initial image. The difference is considered as the monitored object.

According to an embodiment of the invention, the step of determining whether to announce the at least one warning according to the relationship between the at least one threshold and the distance includes calculating a function and determining whether to announce the at least one warning according to a relationship between the at least one threshold and the function. Here, the function is $$\sum_{i=1}^{n}\left(a_i D_i^{b_i}\right)+k,$$

$D_i$ is a distance from the monitored object to an $i^{th}$ reference target of the at least one reference target, $a_i$ and $b_i$ are real numbers, k is a real number larger than $$-\sum_{i=1}^{n}\left(a_i D_i^{b_i}\right),$$

and n is a quantity of the at least one reference target.

According to an embodiment of the invention, the at least one threshold includes a first threshold and a second threshold smaller than the first threshold. The step of determining whether to announce the at least one warning according to the relationship between the at least one threshold and the function includes determining a relationship between the function and the first and second thresholds. If the function is larger than the second threshold and is smaller than the first threshold, a first warning is announced. If the function is smaller than or equal to the second threshold, a second warning is announced.

According to an embodiment of the invention, the at least one threshold includes a first threshold and a second threshold larger than the first threshold, and the step of determining whether to announce the at least one warning according to the relationship between the at least one threshold and the function includes determining a relationship between a reciprocal of the function and the first and second thresholds. If the reciprocal of the function is between the first threshold and the second threshold, a first warning is announced. If the reciprocal of the function is larger than or equal to the second threshold, a second warning is announced.

In an embodiment of the invention, an image surveillance system that includes an image capturing apparatus and an image processing apparatus is provided. The image capturing apparatus captures an image. The image processing apparatus is coupled to the image capturing apparatus. Besides, the image processing apparatus is configured to define at least one reference target in the captured image, identify a monitored object in the image, individually calculate a distance between the monitored object and each of the at least one reference target, and determine whether to announce at least one warning according to a relationship between at least one threshold and the distance.

According to an embodiment of the invention, the at least one reference target includes at least one of a point, a line, and an area in the image.

According to an embodiment of the invention, the image processing apparatus is configured to compare the image with an initial image and identify a difference between the image and the initial image. The difference is considered as the monitored object.

According to an embodiment of the invention, the image processing apparatus is configured to calculate a function and determine whether to announce the at least one warning according to a relationship between the at least one threshold and the function. Here, the function is $$\sum_{i=1}^{n}\left(a_i D_i^{b_i}\right)+k,$$

$D_i$ is a distance from the monitored object to an $i^{th}$ reference target of the at least one reference target, $a_i$ and $b_i$ are real numbers, k is a real number larger than $$-\sum_{i=1}^{n}\left(a_i D_i^{b_i}\right),$$

and n is a quantity of the at least one reference target.

According to an embodiment of the invention, the at least one threshold includes a first threshold and a second threshold smaller than the first threshold, and the image processing apparatus is configured to determine a relationship between the function and the first and second thresholds. If the function is larger than the second threshold and is smaller than the first threshold, a first warning is announced. If the function is smaller than or equal to the second threshold, a second warning is announced.

According to an embodiment of the invention, the at least one threshold includes a first threshold and a second threshold larger than the first threshold, and the image processing apparatus is configured to determine a relationship between a reciprocal of the function and the first and second thresholds. If the reciprocal of the function is between the first threshold and the second threshold, a first warning is announced. If the reciprocal of the function is larger than or equal to the second threshold, a second warning is announced.

As discussed above, in the image surveillance method and the image surveillance system described herein, the distance from the monitored object and each reference target may be monitored in real time, and at least one warning may be announced if the monitored object is overly close to any of the reference targets. Thereby, a user of the image surveillance system need not pay attention to the image surveillance system at all times, and surveillance is thus facilitated.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

In an embodiment of the invention, an image surveillance method and an image surveillance system are provided. Specifically, when a monitored object approaches a reference target, whether to announce a warning (e.g., sound and/or light) is determined according to a distance from the reference target to the monitored object. In addition to the on-the-spot warning, the image surveillance system is also able to inform the user of a warning in form of messages, such that the user is allowed to perform the surveillance/receive the warning even though he or she does not constantly watch the images taken by the surveillance system.

Figure 1:
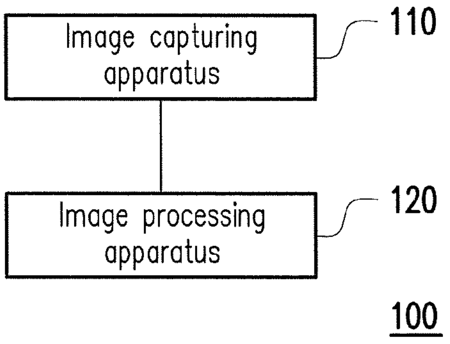
FIG. 1 is a schematic diagram illustrating an image surveillance system according to an embodiment of the invention.

FIG. 1 is a schematic diagram illustrating an image surveillance system according to an embodiment of the invention. In the present embodiment, the image surveillance system 100 includes an image capturing apparatus 110 and an image processing apparatus 120. The image capturing apparatus 110 is, for instance, a camcorder, a monitor, an internet protocol (IP) camera, or any other apparatus capable of capturing images. The image processing apparatus 120 is coupled to the image capturing apparatus 110 and may be a notebook computer, a personal computer (PC), a work station, a smart phone, a tablet PC, or any other similar device capable of processing images.

Figure 2:
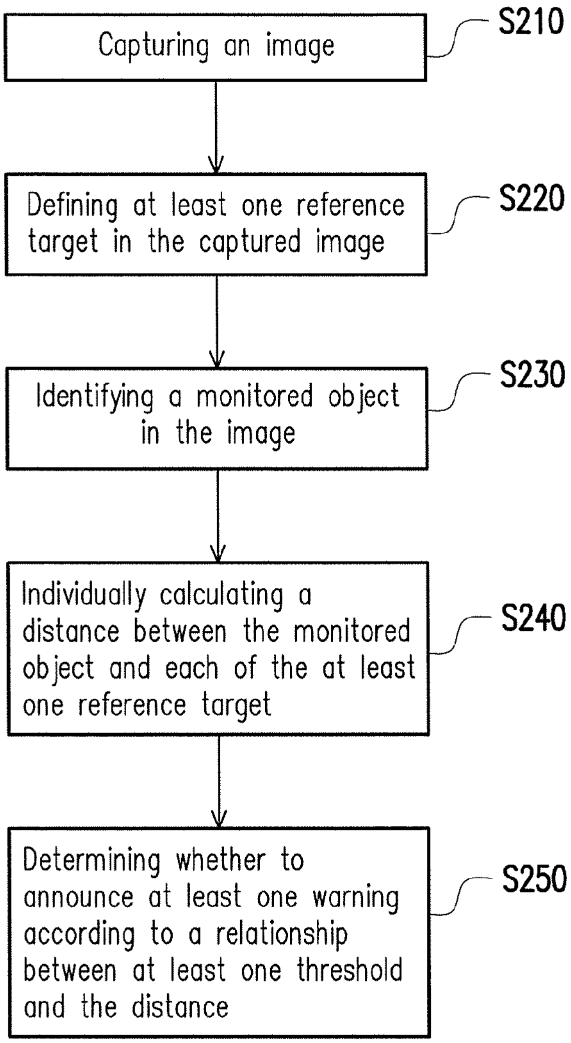
FIG. 2 is a schematic flowchart illustrating an image surveillance method according to an embodiment of the invention.

FIG. 2 is a schematic flowchart illustrating an image surveillance method according to an embodiment of the invention. The image surveillance method described in the present embodiment is suitable for the image surveillance system 100 depicted in FIG. 1, and each step of the image surveillance method is explained hereinafter with reference to the components in the system 100 depicted in FIG. 1.

With reference to FIG. 1 and FIG. 2, in step S210, the image capturing apparatus 110 captures an image through an image capturing device (e.g., a lens). The image is, for instance, an image showing the surveillance area of the image surveillance system 100. In step S220, the image processing apparatus 120 defines at least one reference target is defined in the captured image. The at least one reference target includes at least one of a point, a line, and an area in the image, for instance.

In an embodiment of the invention, the image processing apparatus 120 may, after receiving the image, display the image on a user's interface. The user may then determine the reference target in the image through the user's interface. In another embodiment of the invention, the image processing apparatus 120 may, after receiving the image, spontaneously capture a distinct object in the image and define the object as the reference target, which should not be construed as a limitation to the invention. The distinct object may be determined according to design requirements of actual products. For instance, the distinct object may be a point with a certain size, a line with a certain length, an area within a certain range, a point/line/area with a certain color, or any other object that may be identified by the image processing apparatus 120.

In step S230, the image processing apparatus 120 identifies a monitored object in the image. The monitored object is, for instance, the principal target monitored by the image surveillance system 100. To be specific, in an anti-theft scenario, the monitored object may be a person whose photograph is taken by the image surveillance system 100. In step S230, the method of identifying the monitored object in the image is not limited in the present embodiment. For instance, in an embodiment of the invention, the image processing apparatus 120 may identify the monitored object in the image by way of motion estimation. In another embodiment of the invention, the image processing apparatus 120 may compare the image with an initial image and identify a difference between the image and the initial image. The difference is considered as the monitored object.

The initial image is an image initially captured by the image capturing apparatus 110 within the surveillance area of the image capturing apparatus 110 after the image capturing apparatus 110 is completely installed, for instance. Generally, the initial image does not include any suspicious human being or object. If there is a difference between the image and the initial image, it means that the object (including the human being) appears within the surveillance area of the image capturing apparatus 110 after the image capturing apparatus 110 captures the initial image. Therefore, the image processing apparatus 120 is able to identify the object (corresponding to the difference) as the monitored object.

In step S240, the image processing apparatus 120 calculates a distance between the monitored object and each reference target. According to an embodiment of the invention, the user may place the reference target around a certain object in the image, such that the image processing apparatus 120 is able to correspondingly monitor the distance between the monitored object (e.g., a human being) and the object. For instance, if a work of art exists within the surveillance area of the image surveillance system 100, the user may designate one or more reference targets around the work of art according to the above teachings/description. As long as the distance between the monitored object and the reference target(s) decreases, the image processing apparatus 120 can correspondingly determine that the monitored object is approaching the work of art.

In step S250, the image processing apparatus 120 determines whether to announce at least one warning according to a relationship between at least one threshold and the distance. The at least one threshold is a standard value that serves to determine whether the monitored object is overly close to the reference target(s), and the threshold may be determined by the user according to actual design requirements. In general, if the image processing apparatus 120 determines that the monitored object is overly close to the reference target(s), the image processing apparatus 120 may inform the user of said situation through announcing a warning by means of a buzzer, a speaker, a warning light, a flat display, or the like.

According to the present embodiment, the image may contain plural reference targets, and thus the image processing apparatus 120 may collectively consider the distance between the monitored object and the reference targets in a specific manner and thereby determine whether the monitored object is overly close to the reference targets.

For instance, the image processing apparatus 120 may calculate a function and determine whether to announce at least one warning according to a relationship between the at least one threshold and the function. The function is $$\sum_{i=1}^{n}\left(a_i D_i^{b_i}\right)+k,$$

$D_i$ is a distance from the monitored object to an $i^{th}$ reference target of the reference targets, $a_i$ and $b_i$ are real numbers, k is a real number larger than $$-\sum_{i=1}^{n}\left(a_i D_i^{b_i}\right),$$

and n is a quantity of the reference targets.

In step S250, the image processing apparatus 120 described in an embodiment of the invention determines whether to announce the warning according to the relationship between one threshold and the distance. In another embodiment of the invention, the image processing apparatus 120 in step S250 may determine whether to announce different warnings according to the relationship between plural thresholds and the distance. For instance, the image processing apparatus 120 may determine whether the function is between the first threshold and the second threshold that is smaller than the first threshold. If yes, the image processing apparatus 120 may announce a first warning. The first warning is a warning signal (e.g., sound, light, or a message) reminding the user that the monitored object is so close to the reference target to an alarming extent. If the function is not between the first threshold and the second threshold, the image processing apparatus 120 may further determine whether the function is smaller than the second threshold. If yes, the image processing apparatus 120 may announce a second warning. The second warning is a warning signal (e.g., louder sound or brighter light as compared to the first warning) reminding the user that the monitored object is overly close to the reference target.

In another embodiment, the image processing apparatus 120 may also determine whether to announce the warning according to a relationship between a reciprocal of the function and the threshold. Specifically, the image processing apparatus 120 may determine whether the reciprocal of the function is between a third threshold and a fourth threshold that is larger than the third threshold. If yes, the image processing apparatus 120 may announce a first warning. If the reciprocal of the function is not between the third threshold and the fourth threshold, the image processing apparatus 120 may further determine whether the reciprocal of the function is larger than the fourth threshold. If yes, the image processing apparatus 120 may announce a second warning.

FIG. 1 merely illustrates one image capturing apparatus 110, while the image surveillance system 100 in another embodiment may include plural image capturing apparatuses that are coupled to the image processing apparatus 120. Under said circumstances, the image processing apparatus 120 may simultaneously process the images transmitted from these image capturing apparatuses, so as to perform surveillance within the surveillance area of these image capturing apparatuses.

In the image surveillance method and the image surveillance system described herein, the distance from the monitored object and each reference target may be monitored in real time. If the monitored object approaches and is overly close to any of the reference targets, the first warning or the second warning (or even more warnings) may be correspondingly announced according to the extent to which the monitored object approaches the reference targets.

Figure 3:
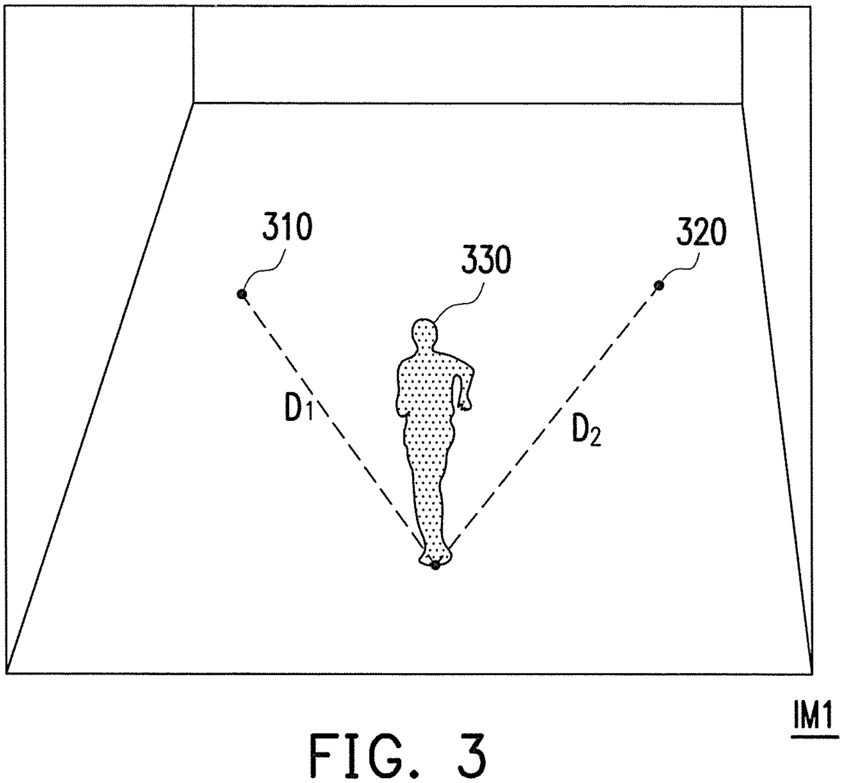
FIG. 3 to FIG. 6 are schematic diagrams respectively illustrating an image surveillance mechanism according to different embodiments of the invention.

FIG. 3 is a schematic diagram illustrating an image surveillance mechanism according to an embodiment of the invention. In the present embodiment, the image IM1 is, for instance, captured by the image capturing apparatus 110 within its surveillance area. The image IM1 includes reference targets 310 and 320 (e.g., two points) and a monitored object 330 (e.g., a human being). The way to define the reference targets 310 and 320 and the way to detect the monitored object 330 may refer to the step S220 and the step S230 shown in FIG. 2, respectively, and thus no further description is provided hereinafter.

As discussed above, in the step S240, the image processing apparatus 120 calculates the distance $D_1$ between the monitored object 330 and the reference target 310 and the distance $D_2$ between the monitored object 330 and the reference target 320. After that, the image processing apparatus 120 determines whether to announce a warning in the step S250 (according to the relationship between at least one threshold and the distance).

Specifically, the image processing apparatus 120 may calculate the function. In the present embodiment, the function is $a_1D_1^{b1}+a_2D_2^{b2}+k$, wherein $a_1$, $a_2$, $b_1$, $b_2$, and k are real numbers and may be determined by the designer or the user of the image surveillance system 100 based on actual demands. For instance, the function may be set as $a_1D_1+a_2D_2$. The image processing apparatus 120 may then determine whether the function (i.e., $a_1D_1^{b1}+a_2D_2^{b2}+k$) is between the first threshold and the second threshold. If yes, the image processing apparatus 120 may announce a first warning (e.g., in form of sound at a normal volume). If not, the image processing apparatus 120 may continue to determine whether the function is smaller than the second threshold. If the function is smaller than the second threshold, the image processing apparatus 120 may announce a second warning (e.g., in form of sound at a large volume).

In another embodiment, the image processing apparatus 120 may also determine whether to announce the warning according to a relationship between a reciprocal (i.e., $(a_1D_1^{b1}+a_2D_2^{b2}+k)^{-1}$) of the function and the threshold. Specifically, the image processing apparatus 120 may then determine whether the reciprocal (i.e., $(a_1D_1^{b1}+a_2D_2^{b2}+k)^{-1}$) of the function is between the third threshold and the fourth threshold. If yes, the image processing apparatus 120 may announce a first warning. If not, the image processing apparatus 120 may continue to determine whether the reciprocal of the function is larger than the fourth threshold. If the reciprocal of the function is larger than the fourth threshold, the image processing apparatus 120 may announce a second warning.

Figure 4:
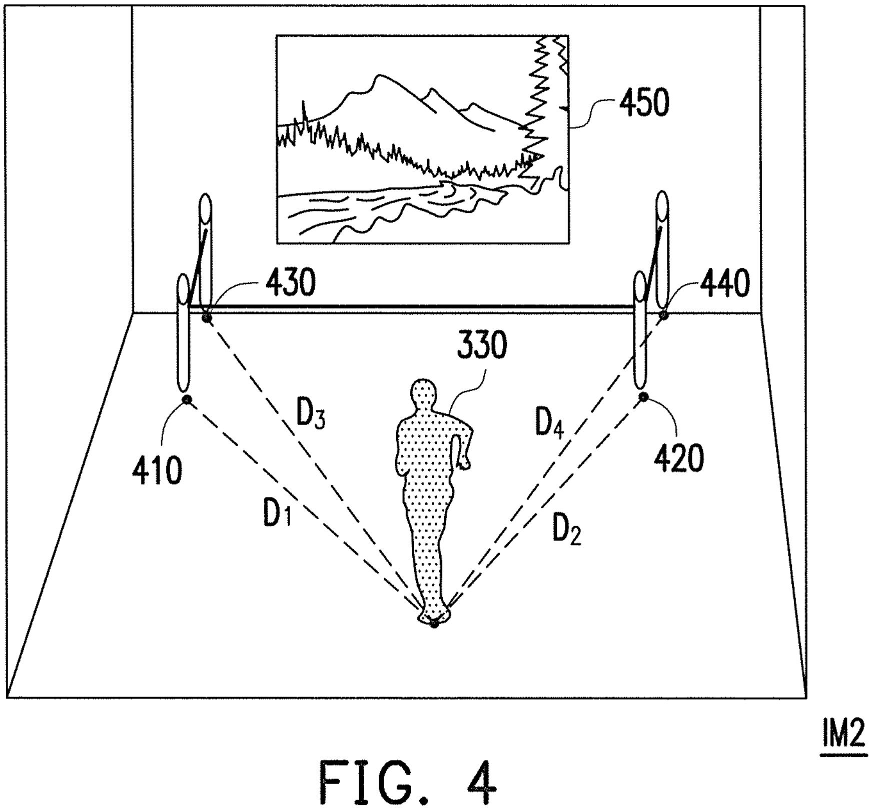

FIG. 4 is a schematic diagram illustrating an image surveillance mechanism according to another embodiment of the invention. In the present embodiment, the image IM2 is, for instance, captured by the image capturing apparatus 110 within its surveillance area. The image IM2 includes four reference targets 410, 420, 430, and 440 (e.g., four points respectively located under four pillars in the image IM2) and a monitored object 330 (e.g., a human being in the image IM2).

The reference targets 410, 420, 430, and 440 may be placed around the object 450 (e.g., a work of art), such that the image surveillance system 100 is allowed to determine whether any suspicious human being approaches the object 450. As shown in FIG. 4, the function correspondingly calculated by the image processing apparatus 120 is $a_1D_1^{b1}+a_2D_2^{b2}+a_3D_3^{b3}+a_4D_4^{b4}+k$, for instance. Here, $a_1$ to $a_4$, $b_1$ to $b_4$, and k are real numbers and may be determined by the designer or the user of the image surveillance system 100 based on actual demands. For instance, the function may be set as $a_1D_1+a_2D_2+a_3D_3+a_4D_4$. The distances $D_1$ to $D_4$ are, for instance, distances from the monitored object 330 to the reference targets 410-440, as shown in FIG. 4. After the function (i.e., $a_1D_1^{b1}+a_2D_2^{b2}+a_3D_3^{b3}+a_4D_4^{b4}+k$) is calculated, the image processing apparatus 120 determines whether to announce a warning according to a relationship between the function and the first and second thresholds. In another embodiment, the image processing apparatus 120 may also determine whether to announce a warning according to a relationship between a reciprocal (i.e., $(a_1D_1^{b1}+a_2D_2^{b2}+a_3D_3^{b3}+a_4D_4^{b4}+k)^{-1}$) of the function and the third and fourth thresholds. The implementation details may be referred to as those described in the previous embodiment and therefore will not be further explained below.

Figure 5:
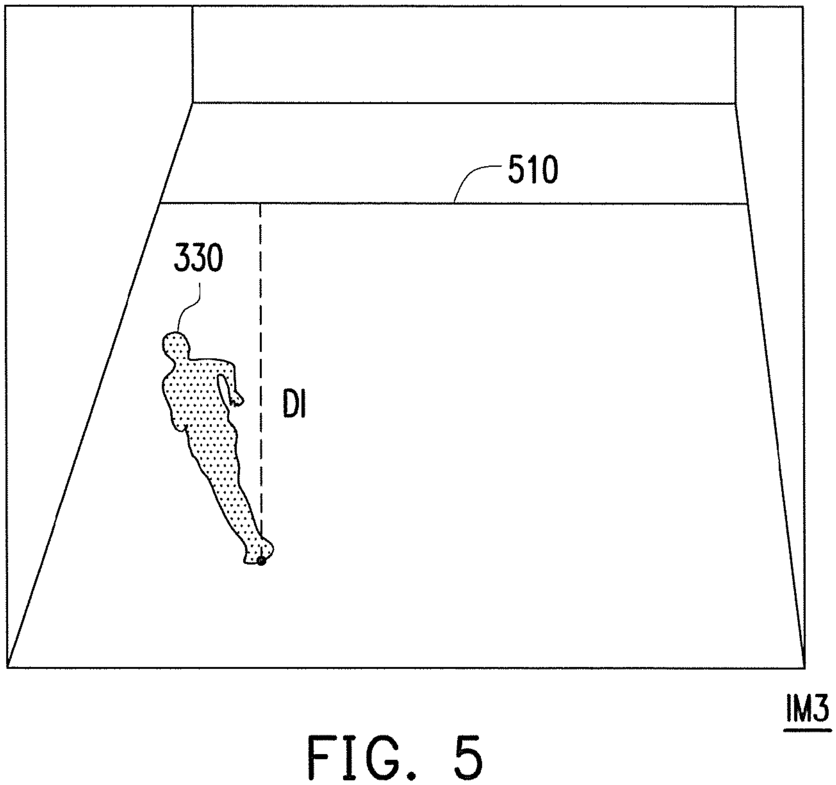

FIG. 5 is a schematic diagram illustrating an image surveillance mechanism according to an embodiment of the invention. In the present embodiment, the image IM3 is, for instance, captured by the image capturing apparatus 110 within its surveillance area. The image IM3 includes a reference target 510 (e.g., one line) and a monitored object 330 (e.g., a human being). In the present embodiment, when the image processing apparatus 120 calculates the distance DI from the reference target 510 to the monitored object 330, the image processing apparatus 120 may consider the minimum distance from the reference target 510 to the monitored object 330 as the distance DI, which should however not be construed as a limitation to the invention. As shown in FIG. 5, the function correspondingly calculated by the image processing apparatus 120 is $a_1DI^{b1}+k$, for instance. After the function (i.e., $a_1DI^{b1}+k$) is calculated, the image processing apparatus 120 determines whether to announce a warning according to a relationship between the function and the first and second thresholds. In another embodiment, the image processing apparatus 120 may also determine whether to announce a warning according to a relationship between a reciprocal (i.e., $(a_1DI^{b1}+k)^{-1}$) of the function and the third and fourth thresholds. The implementation details may be referred to as those described in the previous embodiment and therefore will not be further explained below.

Figure 6:
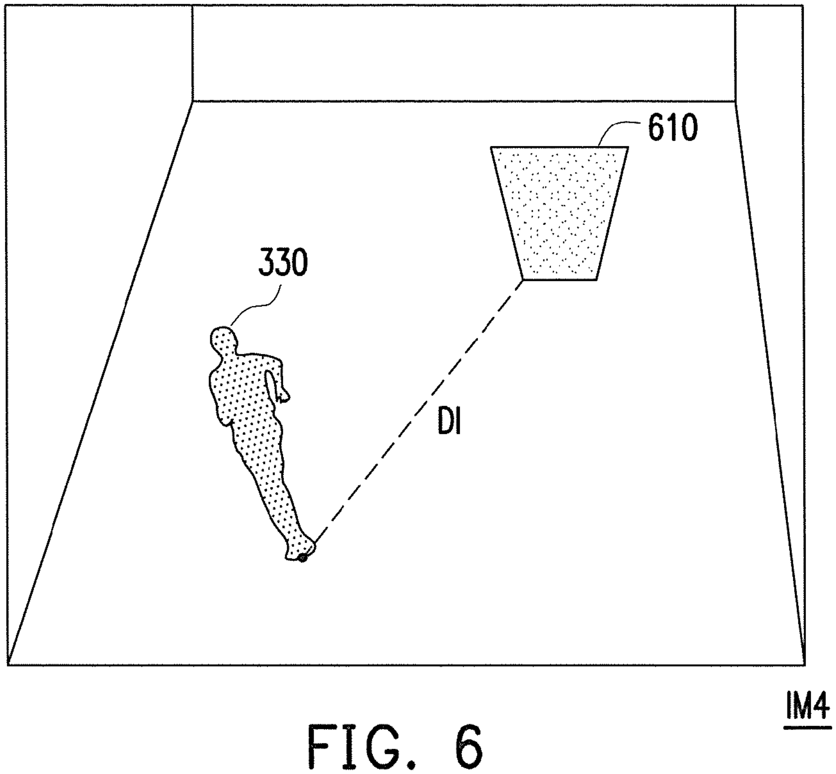

FIG. 6 is a schematic diagram illustrating an image surveillance mechanism according to an embodiment of the invention. In the present embodiment, the image IM4 is, for instance, captured by the image capturing apparatus 110 within its surveillance area. The image IM4 includes a reference target 610 and a monitored object 330 (e.g., a human being). In the present embodiment, the reference target 610 is an area, while the reference target 610 in another embodiment may be one point in the image IM4. When the image processing apparatus 120 calculates the distance DI from the reference target 610 to the monitored object 330, the image processing apparatus 120 may consider the minimum distance from the reference target 610 to the monitored object 330 as the distance DI, which should however not be construed as a limitation to the invention. In another aspect, due to the relatively large coverage of the reference target 610, the image processing apparatus 120 can determine the location of the monitored object in an accurate manner if the image processing apparatus 120 considers the minimum distance from the reference target 610 to the monitored object 330 as the distance DI The implementation details depicted in FIG. 6 may be referred to as those described in the previous embodiment and shown in FIG. 5; therefore, these details will not be further explained below.

In other embodiments of the invention, the image processing apparatus 120 may adjust the relationship between the function and the distance by properly setting up parameters ($a_i$, $b_i$, and k) of the function, which will be elaborated hereinafter.

Figure 7A:
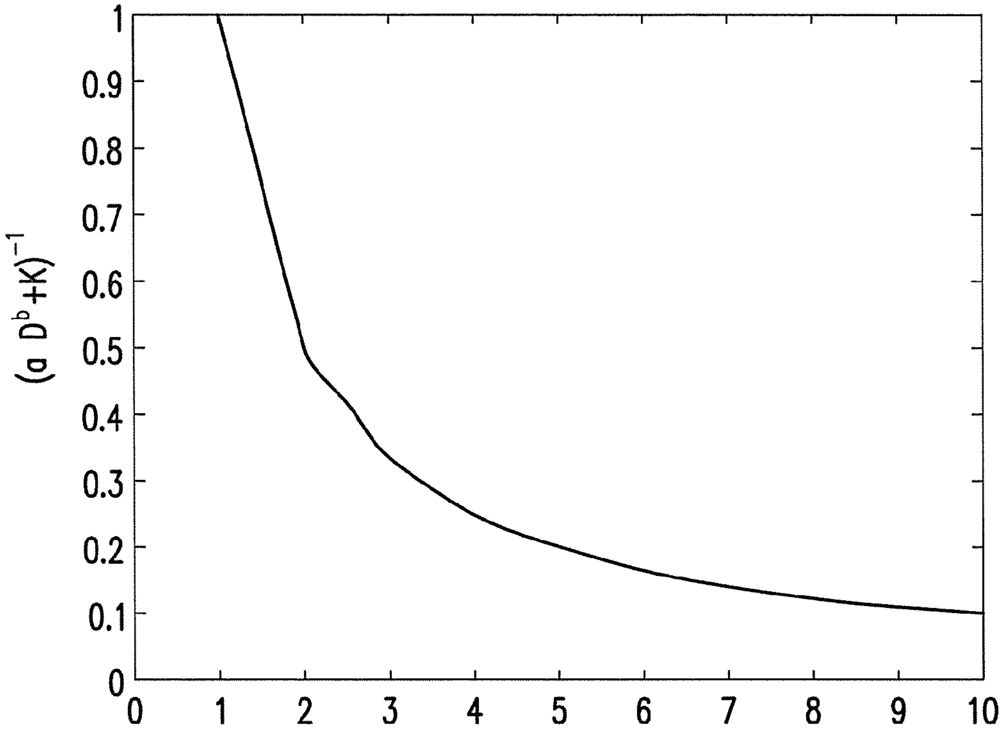
FIG. 7A and FIG. 7B are schematic diagrams illustrating relationships between a function and a distance according to an embodiment of the invention.
Figure 7B:
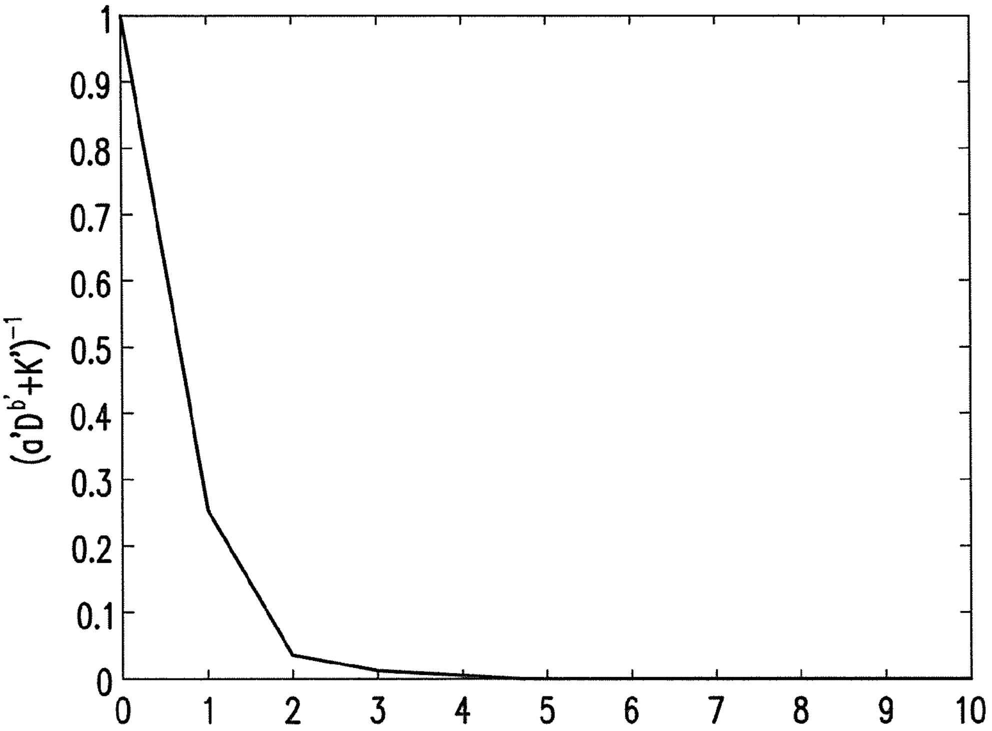

FIG. 7A and FIG. 7B are schematic diagrams illustrating relationships between a function and a distance according to an embodiment of the invention. With reference to FIG. 7A, if the distance from the monitored object to the reference target is assumed to be D, the reciprocal of the function corresponding to the parameters a, b, and k may be represented as $(aD^b+k)^{-1}$, and the corresponding relationship between the reciprocal $(aD^b+k)^{-1}$ of the function and the distance D may be shown by the curve in FIG. 7A, for instance. With reference to FIG. 7B, if the distance from the monitored object to the reference target is assumed to be D, the reciprocal of the function corresponding to the parameters a', b', and k' may be represented as $(a'D^{b'}+k')^{-1}$, and the corresponding relationship between the reciprocal $(a'D^{b'}+k')^{-1}$ of the function and the distance D may be shown by the curve in FIG. 7B, for instance. From another perspective, the user of the image surveillance system 100 may ensure that the surveillance properties of the image surveillance system 100 are likely to be changed by modifying the parameter(s) of the function. For the illustrative purposes, the third threshold and the fourth threshold are exemplarily set as 0.2 and 0.4, for instance.

For instance, if the user intends to have the image processing apparatus 120 announce the first warning when the distance D ranges from 2 to 5 (i.e., when the function ranges from about 0.2 to about 0.4) and have the image processing apparatus 120 announce the second warning when the distance D is shorter than 2 (i.e., when the function is greater than 0.4), the user may adjust the surveillance manner of the image surveillance system 100 to that shown in FIG. 7A by modifying the parameters a, b, and k.

In another example, if the user intends to have the image processing apparatus 120 announce the first warning when the distance D ranges from 0.9 to 1.1 (i.e., when the function ranges from about 0.2 to about 0.4) and have the image processing apparatus 120 announce the second warning when the distance D is shorter than 0.9 (i.e., when the function is greater than 0.4), the user may adjust the surveillance manner of the image surveillance system 100 to that shown in FIG. 7B by modifying the parameters a', b', and k'.

To sum up, according to the image surveillance method and the image surveillance system described herein, the distance from the monitored object and each reference target may be monitored in real time. If the monitored object approaches and is overly close to any of the reference targets, the first warning or the second warning may be correspondingly announced according to the extent to which the monitored object approaches the reference targets. Thereby, the user of the image surveillance system need not pay attention to the image surveillance system at all times, and surveillance is thus facilitated. In addition, when the image surveillance system described herein is actually applied, additional devices (e.g., an infrared transceiver) are not required for detecting the to-be-monitored object, and thus no additional costs may arise. Moreover, the surveillance area of the image surveillance system is the area correspondingly covered by the image. Therefore, even through the image capturing apparatus is applied to monitor a relatively large area, the image surveillance system can still monitor the distance from the monitored object to each reference target and determine whether to announce said warnings according to the distance.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. An image surveillance method suitable for an image surveillance system, the image surveillance method comprising:

capturing an image;

defining at least one reference target in the captured image;

identifying a monitored object in the image;

individually calculating a distance between the monitored object and each of the at least one reference target; and determining whether to announce at least one warning according to a relationship between at least one threshold and the distance, wherein the step of determining whether to announce the at least one warning according to the relationship between the at least one threshold and the distance comprises:

calculating a function; and determining whether to announce the at least one warning according to a relationship between the at least one threshold and the function, wherein the function is $$\sum_{i=1}^{n}\left(a_i D_i^{b_i}\right)+k,$$

$D_i$ is a distance from the monitored object to an $i^{th}$ reference target of the at least one reference target, $a_i$ and $b_i$ are real numbers, k is a real number larger than $$-\sum_{i=1}^{n}\left(a_i D_i^{b_i}\right),$$

and n is a quantity of the at least one reference target.

2. The image surveillance method as recited in claim 1, wherein the at least one reference target comprises at least one of a point, a line, and an area in the image.

3. The image surveillance method as recited in claim 1, wherein the step of identifying the monitored object in the image comprises:

comparing the image with an initial image; and identifying a difference between the image and the initial image as the monitored object.

4. The image surveillance method as recited in claim 1, wherein the at least one threshold comprises a first threshold and a second threshold smaller than the first threshold, and the step of determining whether to announce the at least one warning according to the relationship between the at least one threshold and the function comprises:

determining a relationship between the function and the first and second thresholds;

announcing a first warning if the function is larger than the second threshold and is smaller than the first threshold; and announcing a second warning if the function is smaller than or equal to the second threshold.

5. The image surveillance method as recited in claim 1, wherein the at least one threshold comprises a first threshold and a second threshold larger than the first threshold, and the step of determining whether to announce the at least one warning according to the relationship between the at least one threshold and the function comprises:

determining a relationship between a reciprocal of the function and the first and second thresholds;

announcing a first warning if the reciprocal of the function is between the first threshold and the second threshold; and announcing a second warning if the reciprocal of the function is larger than or equal to the second threshold.

6. An image surveillance system comprising:

an image capturing apparatus capturing an image; and an image processing apparatus coupled to the image capturing apparatus and configured to:

define at least one reference target in the captured image;

identify a monitored object in the image;

individually calculate a distance between the monitored object and each of the at least one reference target; and determine whether to announce at least one warning according to a relationship between at least one threshold and the distance, wherein the image processing apparatus is configured to:

calculate a function; and determine whether to announce the at least one warning according to a relationship between the at least one threshold and the function, wherein the function is $$\sum_{i=1}^{n} \left(a_i D_i^{b_i}\right) + k,$$

$D_i$ is a distance from the monitored object to an $i^{th}$ reference target of the at least one reference target, a, and b, are real numbers, k is a real number larger than $$-\sum_{i=1}^{n} \left(a_i D_i^{b_i}\right),$$

and n is a quantity of the at least one reference target.

7. The image surveillance system as recited in claim 6, wherein the at least one reference target comprises at least one of a point, a line, and an area in the image.

8. The image surveillance system as recited in claim 6, wherein the image processing apparatus is configured to:

compare the image with an initial image; and identify a difference between the image and the initial image as the monitored object.

9. The image surveillance system as recited in claim 6, wherein the at least one threshold comprises a first threshold and a second threshold smaller than the first threshold, and the image processing apparatus is configured to:

determine a relationship between the function and the first and second thresholds;

announce a first warning if the function is larger than the second threshold and is smaller than the first threshold; and announce a second warning if the function is smaller than or equal to the second threshold.

10. The image surveillance system as recited in claim 6, wherein the at least one threshold comprises a first threshold and a second threshold larger than the first threshold, and the image processing apparatus is configured to:

determine a relationship between a reciprocal of the function and the first and second thresholds;

announce a first warning if the reciprocal of the function is between the first threshold and the second threshold; and announce a second warning if the reciprocal of the function is larger than or equal to the second threshold.

* * * * *